US009183660B2

(12) United States Patent
Koperwas et al.

(10) Patent No.: US 9,183,660 B2
(45) Date of Patent: *Nov. 10, 2015

(54) COMBINING SHAPES FOR ANIMATION

(71) Applicant: LUCASFILM ENTERTAINMENT COMPANY, LTD., San Francisco, CA (US)

(72) Inventors: Michael Koperwas, San Francisco, CA (US); Frederic P. Pighin, Sausalito, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/090,686

(22) Filed: Nov. 26, 2013

(65) Prior Publication Data

US 2014/0085315 A1   Mar. 27, 2014

Related U.S. Application Data

(63) Continuation of application No. 12/793,075, filed on Jun. 3, 2010, now Pat. No. 8,614,714.

(60) Provisional application No. 61/288,536, filed on Dec. 21, 2009.

(51) Int. Cl.
*G06T 13/40* (2011.01)
*G06T 13/20* (2011.01)
(Continued)

(52) U.S. Cl.
CPC .............. *G06T 13/40* (2013.01); *G06K 9/6255* (2013.01); *G06T 13/20* (2013.01); *G06T 19/20* (2013.01); *G06T 2219/2021* (2013.01)

(58) Field of Classification Search
CPC ......... G06T 13/00; G06T 13/20; G06T 13/40; G06T 15/503; G06T 11/40; G03C 7/3041; H04L 12/1818; H04L 12/5805; H04L 12/581
USPC ........................................................ 345/474
See application file for complete search history.

(56) References Cited

U.S. PATENT DOCUMENTS 5,111,409 A    5/1992  Gasper et al.
5,995,119 A   11/1999  Cosatto et al.
(Continued)

OTHER PUBLICATIONS

"Exploring Non-Linear Relationship of Blendshape Facial Animation" by Xuecheng Liu, Shihong Xia, Yiwen Fan, and Zhaoqi Wang, Computer Graphics forum, vol. 30 (2011), No. 6 pp. 1655-1666, 2011.*

(Continued)

*Primary Examiner* — Ke Xiao
*Assistant Examiner* — Kwang Lee
(74) *Attorney, Agent, or Firm* — Kilpatrick Townsend & Stockton LLP

(57) ABSTRACT

A system includes a computing device that includes a memory for storing instructions. The computing device also includes a processor configured to execute the instructions to perform a method that includes combining, in a nonlinear manner, a first set of vertex displacements that represent the difference between a first animated expression and a neutral animated expression with a second set of vertex displacements that represent the difference between a second animated expression and the neutral animated expression. The number of vertices associated with the first set of vertex displacements of the first animated expression is equivalent to the number of vertices associated with the second set of vertex displacements of the second animated expression.

30 Claims, 5 Drawing Sheets

(51) Int. Cl.
*G06T 19/20* (2011.01)
*G06K 9/62* (2006.01)

(56) References Cited

U.S. PATENT DOCUMENTS

| | | | |
|---|---|---|---|
| 6,061,072 A | | 5/2000 | Rouet et al. |
| 6,307,576 B1 | | 10/2001 | Rosenfeld |
| 6,731,302 B1 | | 5/2004 | Cote |
| 6,876,364 B2 | | 4/2005 | Buddemeier et al. |
| 7,027,054 B1 | | 4/2006 | Cheiky et al. |
| 7,129,949 B2 | | 10/2006 | Marschner et al. |
| 7,209,577 B2 | | 4/2007 | McAlpine et al. |
| 7,239,321 B2 | | 7/2007 | Berger |
| 7,483,553 B2 | | 1/2009 | Xu et al. |
| 7,589,720 B2 | | 9/2009 | Zhou et al. |
| 8,207,971 B1* | | 6/2012 | Koperwas et al. ............ 345/473 |
| 8,614,714 B1* | | 12/2013 | Koperwas et al. ............ 345/473 |
| 2006/0009978 A1 | | 1/2006 | Ma et al. |
| 2007/0236501 A1* | | 10/2007 | Kim et al. ............ 345/473 |
| 2008/0231640 A1* | | 9/2008 | Pighin et al. ............ 345/619 |
| 2009/0135176 A1 | | 5/2009 | Snoddy et al. |
| 2009/0135177 A1 | | 5/2009 | Strietzel et al. |
| 2009/0153552 A1 | | 6/2009 | Fidaleo et al. |
| 2009/0195545 A1* | | 8/2009 | Debevec et al. ............ 345/473 |
| 2010/0045680 A1* | | 2/2010 | Havaldar et al. ............ 345/473 |
| 2010/0259538 A1 | | 10/2010 | Park et al. |

OTHER PUBLICATIONS

Allen et al. "The space of human body shapes: reconstruction and parameterization from range scans", ACM SIGGRAPH 2003, Jul. 27-31, 2003, 8 pages.

Lewis et al. "Reducing Blendshape Interference by Selected Motion Attenuation", Proceedings of the 2005 Symposium on Interactive 3D Graphics and Games (I3D '05), 2005, 5 pages.

Magnenant-Thalmann et al. "Automatic Modeling of Virtual Humans and Body Clothing", 2004, pp. 575-584.

Parke, F. "Parameterized Models for Facial Animation", IEEE, Nov. 1982, pp. 61-68.

Seo et al. "Synthesizing Animatable Body Models with Parameterized Shape Modifications", Eurographics/SIGGRAPH Symposium on Computer Animation, 2003, pp. 120-125, 370.

* cited by examiner

COMBINING SHAPES FOR ANIMATION

CLAIM OF PRIORITY

The present application is a Continuation of U.S. application Ser. No. 12/793,075, filed on Jun. 3, 2010, entitled "Combining Shapes for Animation," which claims priority to U.S. Provisional Application No. 61/288,536, filed Dec. 21, 2009, of which the entire disclosures are incorporated herein by reference for all purposes.

TECHNICAL FIELD

This document relates to combining shapes such as blend shapes for animation production.

BACKGROUND

Parametric models may be generated by a computer for producing animated characters with deformable facial expressions. To simulate the complexity of muscle movement in a character's face, one or more modeling techniques may be implemented. For example, physically-based modeling techniques may be implemented that attempt to simulate various skin layers, muscles, tissues, bone and other components to approximate the mechanics of a face. In another technique, the character's face may be reduced to a collection of vertices whose positions may be adjusted to different facial expressions. Dependent upon the desired level of resolution, an extremely large number of vertices (e.g., tens of thousands, millions, etc.) may be included in such models. For some facial expressions, the positions of relatively few vertices may be adjusted, while significant position adjustments may be needed for representing other expressions.

SUMMARY

The systems and techniques described here relate to combining blend shapes, in a nonlinear manner, to produce facial expressions of animated characters.

In one aspect, a computer-implemented method includes combining, in a nonlinear manner, a first set of vertex displacements that represent the difference between a first animated expression and a neutral animated expression with a second set of vertex displacements that represent the difference between a second animated expression and the neutral animated expression. The number of vertices associated with the first set of vertex displacements of the first animated expression is equivalent to the number of vertices associated with the second set of vertex displacements of the second animated expression.

Implementations may include any or all of the following features. Combining, in a nonlinear manner, may include a combination of nonlinear and linear operations. Combining includes determining an expected value of at least one vertex displacement included in the first set of vertex displacements and a corresponding vertex displacement included in the second set of vertex displacements. Combining, in a nonlinear manner, may include biasing the first set of vertex displacements that represent the difference between the first animated expression and the neutral animated expression. Combining, in a nonlinear manner, may include determining if a vertex displacement included in the first set of vertex displacements extends in a direction equivalent to a corresponding vertex displacement included in the second set of vertex displacements. Combining, in a nonlinear manner, may include applying a weight to the vertex displacement in the first set of vertex displacements that extends in the direction equivalent to the corresponding vertex displacement included in the second set of vertex displacements. Combining, in a nonlinear manner, may include applying a weight to at least one vertex displacement included in the first set of vertex displacements. Combining, in a nonlinear manner, may include applying a weight to at least one displacement of the combined first and second set of vertex displacements. The first animated expression may include a facial expression of an animated character. Combining, in a nonlinear manner, may be initiated by user input.

In another aspect, a computer program product tangibly embodied in an information carrier and comprising instructions that when executed by a processor perform a method that includes combining, in a nonlinear manner, a first set of vertex displacements that represent the difference between a first animated expression and a neutral animated expression with a second set of vertex displacements that represent the difference between a second animated expression and the neutral animated expression. The number of vertices associated with the first set of vertex displacements of the first animated expression is equivalent to the number of vertices associated with the second set of vertex displacements of the second animated expression.

In another aspect, a system includes a computing device that includes a memory configured to store instructions. The computing device also includes a processor configured to execute the instructions to perform a method that includes combining, in a nonlinear manner, a first set of vertex displacements that represent the difference between a first animated expression and a neutral animated expression with a second set of vertex displacements that represent the difference between a second animated expression and the neutral animated expression. The number of vertices associated with the first set of vertex displacements of the first animated expression is equivalent to the number of vertices associated with the second set of vertex displacements of the second animated expression.

Details of one or more implementations are set forth in the accompanying drawings and the description below. Other features, aspects and advantages will be apparent from the description and drawings, and from the claims.

DESCRIPTION OF DRAWINGS

Like reference symbols in the various drawings indicate like elements.

DETAILED DESCRIPTION

Figure 1:
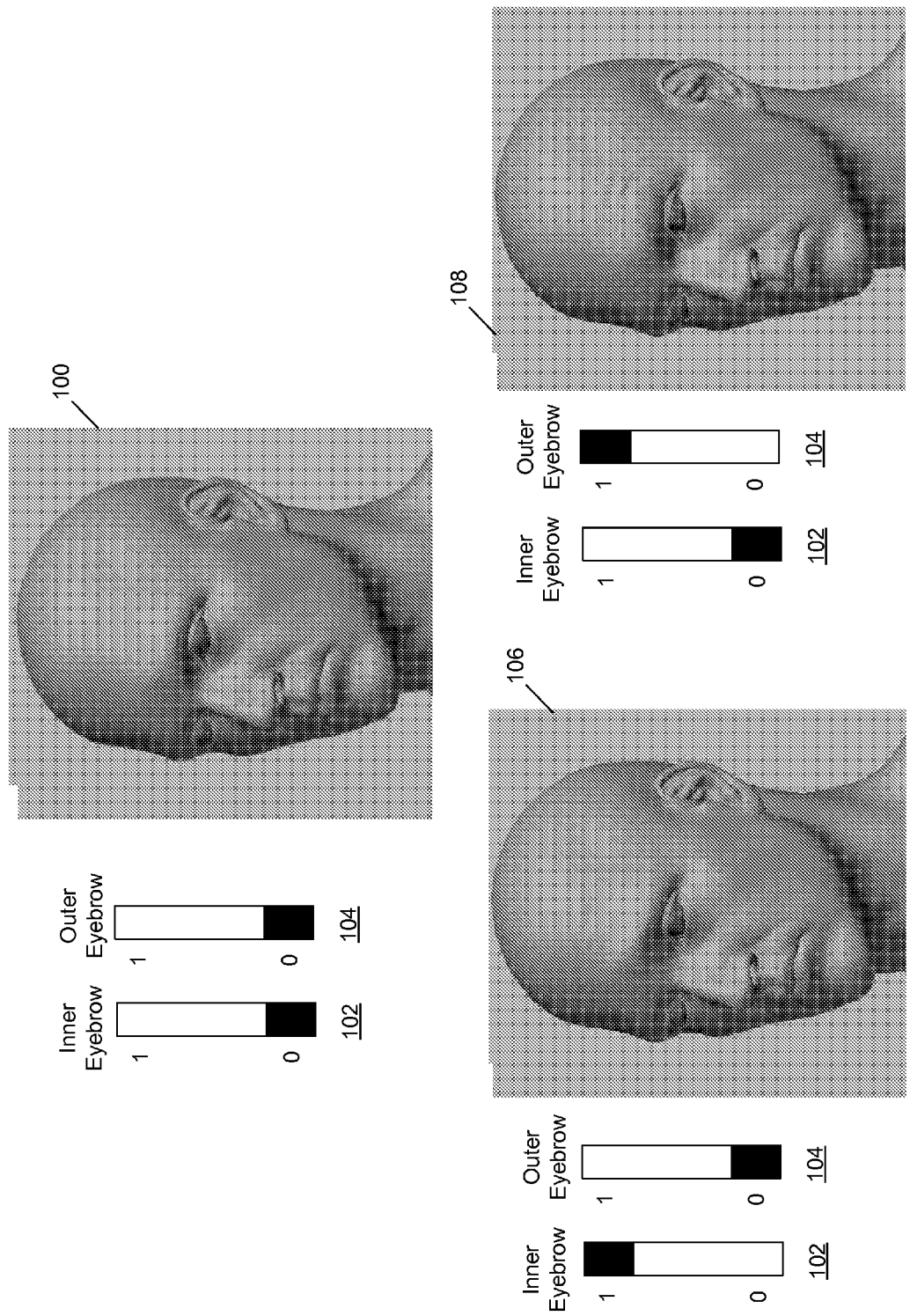
FIG. 1 illustrates exemplary expressions of an animated face.

Referring to FIG. 1, features of an animated character such as animated facial expressions may be produced from blend shape animation techniques. In general, a blend shape provides a collection of relative displacements of vertices to define a particular facial expression. For example, an animated character's face can be represented as a collection of vertices (e.g., a three-dimensional mesh) and each vertex may be positioned to define a particular geometry. Typically, the vertices are placed in rest positions (referred to as a rest geometry) to define a neutral facial expression that may be deformed to produce a range of expressions. From this neutral expression, a blend shape defines the displacement of each vertex to produce an expression or a range of expressions. For example, applying the displacements to the vertices of the neutral expression, another expression (e.g., a smiling face, a frowning face, etc.) is produced.

Along with defining a blend shape to represent different emotions on the face of an animated character, blend shapes may also be used to represent various portions of an animated face. For example, particular parts of the human face can convey a range of emotions through relatively small movements. As an example, very subtle movements of an eyebrow (or portions of an eyebrow) can register an array of easily recognizable emotions with a viewer. In the illustration shown in the figure, two blend shapes respectively define the displacements of vertices associated with an eyebrow. In particular, one blend shape defines the displacements of vertices associated with the inner portion of an animated character's left eyebrow and another blend shape defines similar displacements of vertices associated with the outer portion of the character's eyebrow. To illustrate the controllability of the position changes provided by the blend shapes, a slider is used to control the amount of displacement (relative to a rest geometry). For example, a representation 100 of an animated character is illustrated in which both of the eyebrow blend shapes are inactive as indicated by the zero values dialed into a slider 102 (associated with the inner eyebrow blend shape) and a slider 104 (associated with the outer eyebrow blend shape). As such, representation 100 illustrates a neutral expression (or rest geometry) of the character's face.

By dialing up the sliders, the blend shapes are respectively activated and accordingly change the appearance of the character's facial expression. For example, referring to a representation 106, the slider 102 associated with the inner eyebrow blend shape is dialed to a maximum value (e.g., a value of one). Correspondingly, the vertices associated with the blend shape are moved to their maximum displacement positions. As represented in the representation 106, the inner portion of the character's left eyebrow is clearly protruding outward based upon dialing up of the blend shape with the slider 102. Similarly, by dialing up the slider 104 associated with the outer eyebrow blend shape, the vertices associated with this shape are moved to their maximum displacement positions. As illustrated, a representation 108 shows the outer portion of the character's left eyebrow protruding outward (are represented by the dialed-up slider 104) while the inner portion of the eyebrow has returned to its rest geometry (as controlled by the zero-value of the slider 102).

As shown in representations 106 and 108, by independently activating and controlling each blend shape, displacements are appropriately applied to corresponding portions of the character for adjusting the presented facial expression. However, activating and applying the blend shapes in combination may not always provide the desired expression. Since vertices may be common to both blend shapes, dialing up position displacement for both blend shapes may cause interference and produce undesired results.

Figure 2:
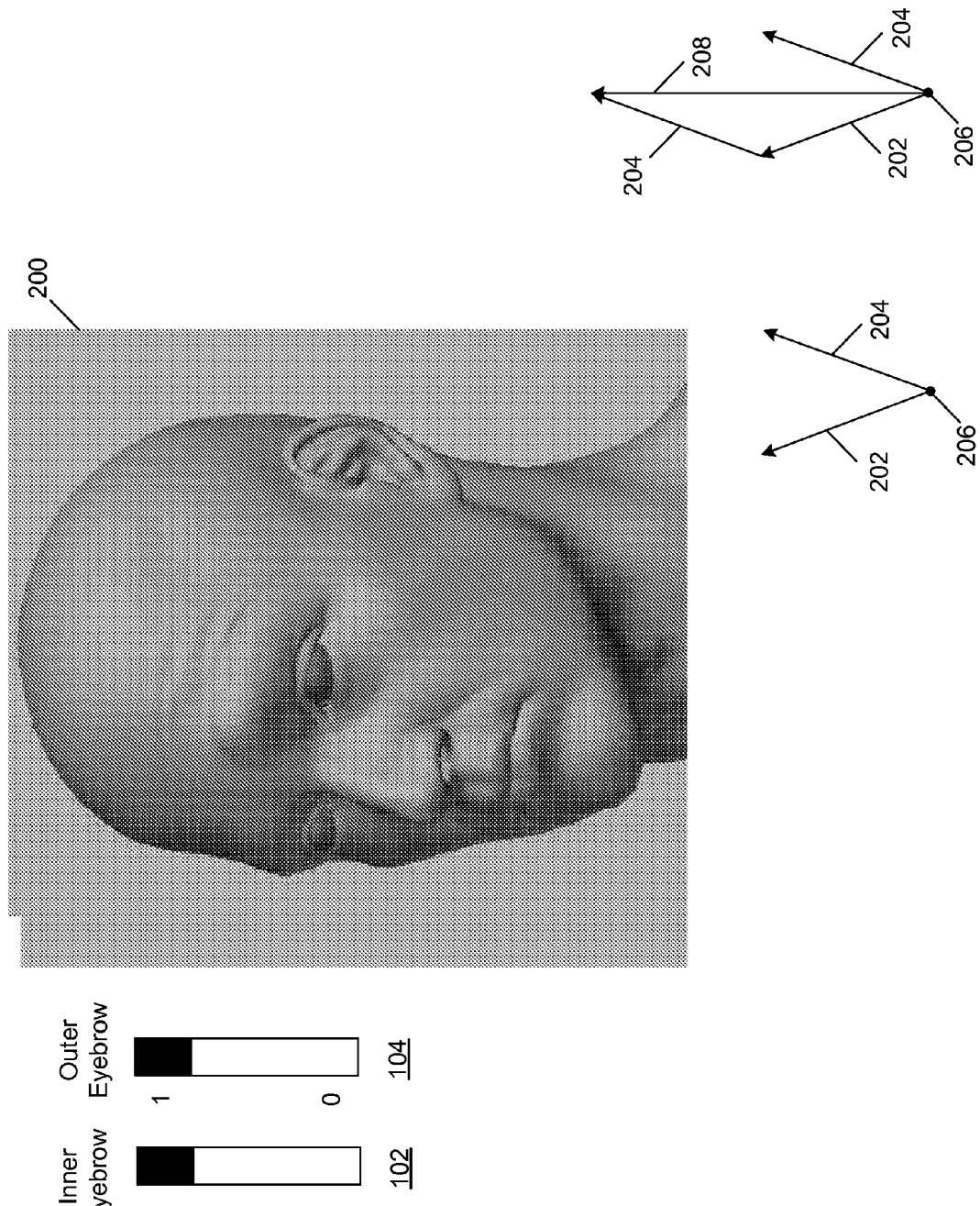
FIG. 2 illustrates interfering shapes of an animated expression.

Referring to FIG. 2, a representation 200 of the character's face is illustrated with both blend shapes fully activated (as represented by both of the sliders 102 and 104 being dialed-up to values of one). However, by maximizing displacement of both blend shapes, the vertices may be extended to positions that would produce a facial expression that a viewer may consider as being physically unrealistic. In this particular example, the character's entire left eyebrow is over extended in the outward direction to produce a protruding bulge that may even appear as a swollen eyebrow to some viewers.

Typically, when multiple blend shapes are dialed-up that are associated with common vertices (e.g., share vertices, indirectly effect neighboring vertices, etc.), multiple displacements may be applied to one vertex (or multiple vertices). As such, the displacements of the vertices may interfere and cause unrealistic representations to be produced. For example, combining blend shapes (e.g., a smiling expression and a expression of fear) that contain correlated movements (e.g., eyebrows are raised in both expression) may cause interference (e.g., eyebrows that over extend in an outward direction). Some conventional techniques exacerbate this condition by adding displacements (associated with multiple blend shapes) to determine the total displacement for each vertex. To graphically represent such an occurrence, two displacements are represented in the figure by vectors 202 and 204 (e.g., that are provided by two blend shapes) that are applied to a vertex 206. While each of the displacements are approximately equal in magnitude, each displacement is directed in different directions (as illustrated by the vector 202 and 204). To sum the two displacements, vector addition may be implemented to produce a sum, which is represented by a vector 208. As illustrated, the magnitude of the vector 208 may be considered significant compared to the magnitudes of the individual vectors 202 and 204. As such, adding displacements associated with a common vertex may produce a result that drastically departs from the magnitudes of the individual vectors (being dialed-up to provide expressions). This occurrence may be particularly pronounced in instances when both displacements extend in similar directions. To combat such instances of interference (e.g., constructive interference) caused by multiple displacements being applied to common vertices, one or more techniques may be implemented. For example, one or more constraints may be applied to blend shapes to reduce the effects of such interference.

Figure 3:
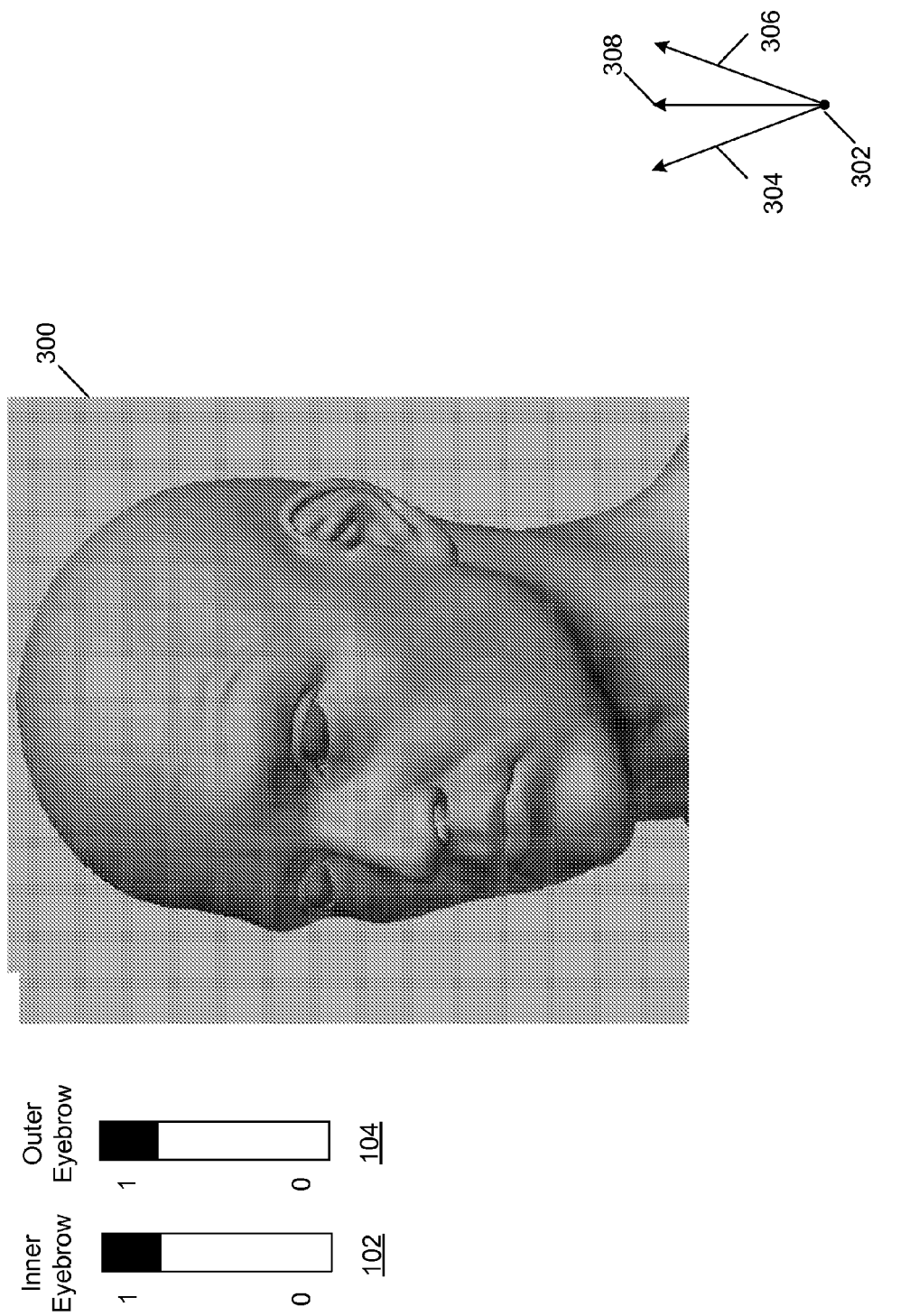
FIG. 3 illustrates combining shapes of an animated expression.

Referring to FIG. 3, one or more techniques may be implemented to reduce the effects of interfering blend shapes. For example, non-linear operations may be executed on blend shape displacements being applied to vertices (at a rest geometry). Such non-linear operations may include applying one or more constraints to the displacements that are associated with determining an expected value (e.g. average) of the displacements (for each vertex). Non-linear operations may also include applying one or more biases to the displacements being applied to each vertex. For example, a blend shape that may apply a relatively large displacement to a vertex may be more favorably biased compared to a blend shape that applies a lesser displacement to the vertex. Linear operations may also be executed in concert with non-linear operations. For example, nonlinear operations may enforce one or more thresholds upon displacements associated with multiple blend shapes. Upon enforcing the thresholds (e.g., block or pass displacements that broach the thresholds), a linear operation such as calculating the sum (e.g., vector addition) of the appropriate displacements may be executed to determine the corresponding displacement for each vertex.

In this figure, and similar to the example shown in FIG. 2, both exemplary blend shapes (e.g., the inner eyebrow and the outer eyebrow) are dialed-up to apply maximum displacements to the associated vertices (as represented by the sliders 102 and 104). Rather than calculating the sum of the displacements (at each affected vertex), in this example, the average value of the displacements is determined at each appropriate vertex. As such, the deformation applied to the rest geometry is considerably restrained (compared to applying displacements calculating from the vector addition). A representation 300 illustrates the averaging of the displacements associated with the two applied blend shapes. As shown, the averaged displacements located in the deformed region above the character's left eye are less pronounced compared to the same region shown in FIG. 2. This difference is particularly noticeable for displacements (associated with both blend shapes) that extend in similar directions and are commonly applied vertices. To graphically illustrate an expected value determination, a single vertex 302 is shown along with two vectors 304, 306 that respectively represent displacements associated with two blend shapes. By calculating the expected value from the vectors 304 and 306, a resultant vector 308 is produced for displacing the vertex 302. The magnitude of the resultant vector 308 is noticeably less than the magnitude of the vector 208 calculated from vector addition. As such, the resultant vector 302 may not appear as being overextended (in a rendered facial expression) and producing a non-realistic deformation. Along with calculating the expected value of displacements, for combining the effects of two blend shapes, other combining techniques may be used separately or in concert with expected value calculations. For example, some techniques may account for the direction that displacements extend while operations of other techniques may be direction independent. Higher order statistics (e.g., variance, standard deviation, etc.) may also be used to combine displacements applied by two or more blend shapes.

Criteria for combining displacements from multiple blend shapes may also include other processing operations. For example, other nonlinear operations may include applying one or more biases as blend shape displacements are combined. In one arrangement, one or more biases may be applied to blend shapes that provide relatively large displacements. For example, a blend shape for a particular facial expression (e.g., smiling) may be dialed to apply a maximum displacement (e.g., dialed-up for 100%) and a blend shape for another expression (e.g., frowning) may be partially dialed (e.g., dialed-up to 20%). Once the displacements associated with the two blend shapes are averaged, the former expression (e.g. smiling) may not be appropriately represented in some facial regions (e.g., due to interference, averaging operations, etc.). As such, a bias may be applied to the blend shape so that the facial expression is appropriately represented. Various techniques may be implemented for applying a bias to one or more blend shapes. For example, upon dialing a blend shape to a predefined threshold (e.g., above 75%), a bias may be applied to the blend shape. Differences between dialed-in blend shapes may also be used, for example, if one blend shape is dialed to a level that is a predefined percentage (e.g., 15%) larger than other applied blend shapes, a bias may be applied to the blend shape dialed to the larger level. Along with accounting for blend shapes that operate on a relatively global scale (e.g., apply a smiling expression to a face), neighboring blend shapes may be accounted for on local scale. For example, a bias may be applied to a blend shape (that operates on a portion of an eyebrow) when dialed to a significant level (e.g., 80%) while blend shapes that are associated with neighboring portions of the eyebrow are not biased if dialed to lesser levels (e.g., 10%).

Such nonlinear and combinations of nonlinear and linear operations may be quantified for different applications (e.g., characters, character performances, etc.) and scenarios (e.g., to account for displacements provided by neighboring blend shapes). For example, adding displacements from multiple blend shapes for a vertex may be represented as:

$$G(V) = R(V) + \sum_{i=1}^{n} w_i D_i(V); \quad (1)$$

in which $G(V)$ represents the position of the vertex $V$, $R(V)$ represents the position of the vertex $V$ at a rest geometry, $D_i$ represents the displacement of blend shape $i$ and $w_i$ is a weight applied to the shape $i$. As represented by equation (1), the position of a particular vertex can be considered a combination of the vertex at the rest geometry and the weighted displacement provided by each blend shape. While such a representation accounts for each blend shape, interfering blend shape displacements may effect calculated vertex positions $G(V)$. By introducing a nonlinear constraint, such as an expected value term (e.g., an averaging term), the probability of producing artifacts from interfering blend shapes (e.g., over extending vertices) is reduced. Additionally, a biasing constraint may also be applied for significant displacements (e.g., associated with blend shapes dialed to relatively large levels). In one implementation, such applied constraints may be represented as:

$$G(V) = R(V) + \frac{\sum_{i=1}^{n} w_i^2 \|D_i(V)\| D_i(V)}{\sum_{i=1}^{n} w_i \|D_i(V)\|}; \quad (2)$$

in which $G(V)$ is the position of the vertex, $R(V)$ is the rest position of the vertex, similar to equation (1). In this example, the denominator term provides an averaging operation for determining $G(V)$. Also, an additional weight, which is the normal of each blend shape displacement, is also applied to each displacement at the vertex. As such, influential blend shapes (e.g., with larger displacements) are more heavily weighted in a nonlinear manner than blend shapes with lesser influence (e.g., applying relatively smaller displacements). While this exemplary calculation uses the normal of applied displacements, other nonlinear operations may be incorporated. Further, linear operations (e.g., vector addition) may be introduced in combination with nonlinear operations to reduce the effects of interfering blend shapes. For example, weighting functions that account for displacement direction (e.g., vector quantities) and direction independent (e.g., scalar quantities) may be incorporated. Vector and scalar addition, subtraction, multiplication, division, and applying exponentials along with other similar operations may also be used individually or in combination. Weights may also be assigned based upon vector directions.

Figure 4:
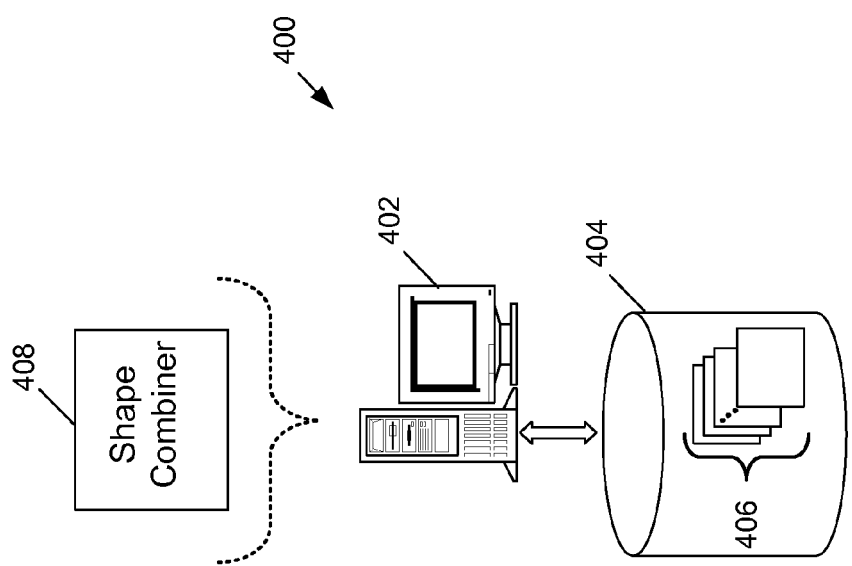
FIG. 4 is a diagram of a character development system.

Referring to FIG. 4, various types of computing devices and platforms may be used to reduce the effects of blend shape interference. For one example, a character development system 400 includes a computer system 402 that is capable of generating animations such as deformable character faces. Along with creating such animations, the character development system 400 may be capable of applying one or more blend shapes to the animations, for example, to produce a range of facial expressions. Along with applying blend shapes, the computer system 402 is capable of executing nonlinear operations, and combinations of linear and nonlinear operations, to reduce interference among possibly competing blend shapes.

Along with components (e.g., interface cards, etc.) for receiving user input (e.g., from a modeler, animator, etc.) and data (e.g., character models) from various sources (e.g., a library of character models, the Internet, other computer systems, etc.), the computer system 402 also includes memory (not shown) and one or more processors (also not shown) to execute processing operations. A storage device 404 (e.g., a hard drive, a CD-ROM, a Redundant Array of Independent Disks (RAID) drive, etc.) is in communication with the computer system 402 and is capable of storing data and providing stored data associated with animation generation and animation performance production. For example, an illustrative set of blend shapes 406 are represented as being stored on the storage device 404 and retrievable by the computer system 402 for creating animations (e.g., character animations). Along with this data, additional types of geometries and information may also be stored in the storage device 404.

In this arrangement, to reduce interfering geometries (e.g., causes by combining two or more blend shapes), a shape combiner 408 is executed by the computer system 402. By providing one or more nonlinear operations, a combination of nonlinear and linear operations, etc., the shape combiner 408 is capable of reducing the effects of two or more competing blend shapes. For example, nonlinear and linear operations associated with equation (2) or similar equations may be executed by the shape combiner 408. To initiate such operations of the shape combiner 408, one or more techniques may be implemented. For example, operations and the execution of the operations associated with shape combiner 408 may be based upon user input (e.g., user interactions with a slider represented in a user interface), the execution of other operations, functions, applications, etc. by the computer system 402 (or other computing devices in communication with the computer system 402) or other similar techniques. Combinations of user input and executing operable instructions may also be used to initiate operations for combining two or more blend shapes. Typically, the shape combiner 408 is implemented in software for being executed by the computer system 402. However, in some arrangements, the functionality may be provided by hardware or a combination of hardware and software.

Figure 5:
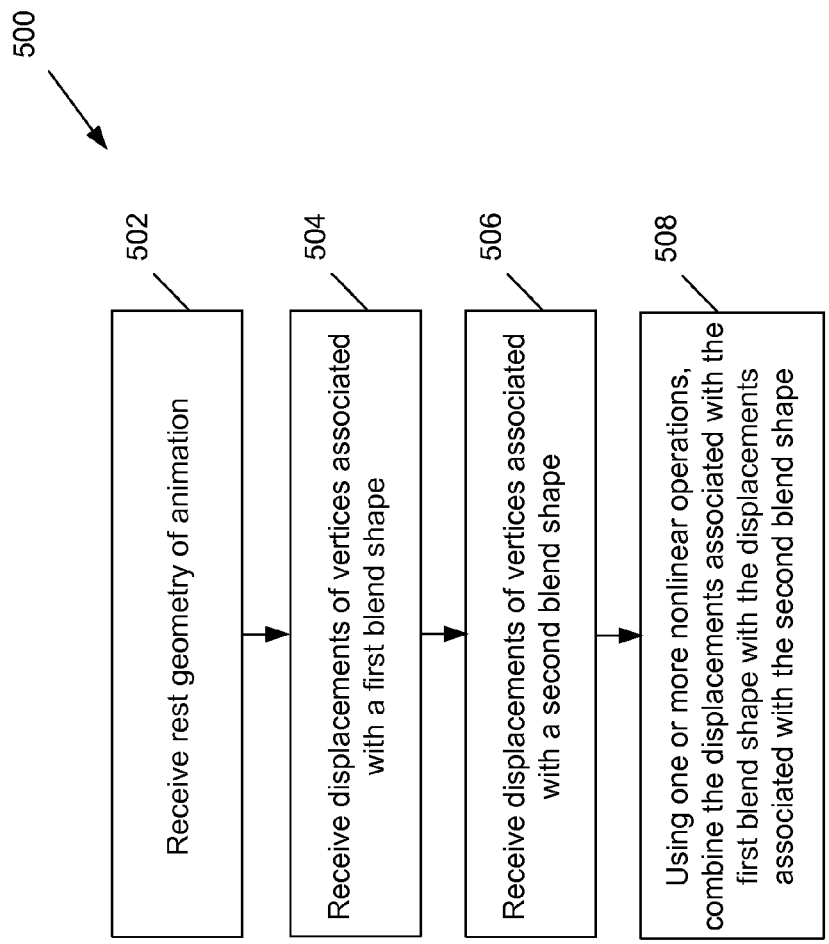
FIG. 5 is a flowchart of operations of a shape combiner.

Referring to FIG. 5, a flowchart 500 represents some of the operations of the shape combiner 408. The operations may be executed by a single computer system (e.g., computer system 402) or multiple computing devices. Along with being executed at a single site (e.g., at one computer system), operation execution may be distributed among two or more sites.

Operations include receiving 502 a rest geometry associated with an animated character, for example, the rest geometry may represent a neutral facial expression of an animated character. Such information may be provided from various sources, for example, data associated with a rest geometry may be retrieved from one or more storage devices (e.g., storage device 404). Software packages (e.g., drawing and painting packages, CAD packages, photograph editing packages, etc.) may be used producing a rest geometry, for example, a previously created character model may be revised (e.g., to produce a neutral facial expressions of the character) or a new model may be created (e.g., digitally sculpt) of a character's face.

Operations also include receiving 504 a first blend shape that includes a set of vertex displacements for producing one or more facial expressions from the neutral expression provided by the rest geometry. Typically, the number of vertices in the blend shape is equivalent to the number of vertices included in the blend shape. As such, the displacements provided by the blend shape map directly to the vertices of the rest geometry. Operations also include receiving 506 a second blend shape (or multiple additional blend shapes) that includes vertex displacements for applying another expression (or series of facial expressions) to the neutral expression provided by the rest geometry. Similar to the first blend shape, the number of vertices included in the additional blend shape (or blend shapes) is equivalent to the number of vertices included in the neutral expression provided by the rest geometry.

To combine 508 the two or more blend shapes and produce a combined expression with the neutral expressions, operations may include using one or more nonlinear operations. For example, nonlinear operations may be used to bias one or more vertex displacements (associated with either blend shape). Through such operations, more pronounced displacements (e.g., associated with a fully dialed-in blend shape) may be more heavily weighted compared to relatively smaller displacements (e.g., associated with a partially dialed-in blend shape). Along with accentuating more dominant blend shapes and down-playing lesser blend shapes, specially for displacements that extend in equivalent directions, such biasing may assist with reducing interference between the blend shapes. The nonlinear operations may also be combined with linear operations such as averaging the displacements associated with blend shapes (or determining other statistical quantities). Averaging displacements may reduce interference artifacts such as combined displacements that appear to over extend vertices included in the rest geometry. As such, using nonlinear operations in combination with linear operations to combine blend shapes may produce more realistic facial expressions or other types of animated features.

To perform the operations described in flow chart 500, the shape combiner 408 may perform any of the computer-implemented methods described previously, according to one implementation. For example, a computer system such as computer system 402 (shown in FIG. 4) may execute the shape combiner 408. The computer system may include a processor (not shown), a memory (not shown), a storage device (e.g., storage device 404), and an input/output device (not shown). Each of the components may be interconnected using a system bus or other similar structure. The processor is capable of processing instructions for execution within the computer system. In one implementation, the processor is a single-threaded processor. In another implementation, the processor is a multi-threaded processor. The processor is capable of processing instructions stored in the memory or on the storage device to display graphical information for a user interface on the input/output device.

The memory stores information within the computer system. In one implementation, the memory is a computer-readable medium. In one implementation, the memory is a volatile memory unit. In another implementation, the memory is a non-volatile memory unit.

The storage device is capable of providing mass storage for the computer system. In one implementation, the storage device is a computer-readable medium. In various different implementations, the storage device may be a floppy disk device, a hard disk device, an optical disk device, or a tape device.

The input/output device provides input/output operations for the computer system. In one implementation, the input/output device includes a keyboard and/or pointing device. In another implementation, the input/output device includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the following claims.

What is claimed is:

1. A computer implemented method comprising:
receiving a first set of weights for a first blendshape to be applied to a neutral animated expression, the first blendshape comprising a first set of vertex displacements that represents the difference between a first animated expression and the neutral animated expression;
receiving a second set of weights for a second blendshape to be applied to the neutral animated expression, the second blendshape comprising a second set of vertex displacements that represents the difference between a second animated expression and the neutral animated expression;
for common vertices in the neutral animated expression that are associated with both the first blendshape and the second blendshape, generating a third set of vertex displacements by combining, in a nonlinear manner, data comprising:
weights from the first set of weights and displacements from the first set of vertex displacements corresponding to the common vertices; and
weights from the second set of weights and displacements from the second set of vertex displacements corresponding to the common vertices;
applying, with one or more processors, the third set of vertex displacements to the common vertices to move the common vertices in the neutral animated expression to new locations and thereby produce a new animated expression; and
rendering the new animated expression to generate a two-dimensional image for display on a display device.

2. The computer implemented method of claim 1, wherein combining, in a nonlinear manner, includes a combination of nonlinear and linear operations.

3. The computer implemented method of claim 1, wherein combining includes determining an expected value of at least one vertex displacement included in the first set of vertex displacements and a corresponding vertex displacement included in the second set of vertex displacements.

4. The computer implemented method of claim 1, wherein combining, in a nonlinear manner, includes biasing the first set of vertex displacements that represent the difference between the first animated expression and the neutral animated expression.

5. The computer-implemented method of claim 1, wherein combining, in a nonlinear manner, includes determining if a vertex displacement included in the first set of vertex displacements extends in a direction equivalent to a corresponding vertex displacement included in the second set of vertex displacements.

6. The computer implemented method of claim 5, wherein combining, in a nonlinear manner, includes applying a weight to the vertex displacement in the first set of vertex displacements that extends in the direction equivalent to the corresponding vertex displacement included in the second set of vertex displacements.

7. The computer-implemented method of claim 1, wherein combining, in a nonlinear manner, includes applying a weight that has an upper limit to at least one vertex displacement included in the first set of vertex displacements.

8. The computer-implemented method of claim 1, wherein combining, in a nonlinear manner, includes applying a weight that is a normal of the first set of vertex displacements and the second set of vertex displacements to at least one displacement of the combined first and second set of vertex displacements.

9. The computer-implemented method of claim 1, wherein the first animated expression includes a facial expression of an animated character.

10. The computer-implemented method of claim 1, wherein combining, in a nonlinear manner, is initiated by user input.

11. A computer program product tangibly embodied in an information carrier and comprising instructions that when executed by a processor perform a method comprising:
receiving a first set of weights for a first blendshape to be applied to a neutral animated expression, the first blendshape comprising a first set of vertex displacements that represents the difference between a first animated expression and the neutral animated expression;
receiving a second set of weights for a second blendshape to be applied to the neutral animated expression, the second blendshape comprising a second set of vertex displacements that represents the difference between a second animated expression and the neutral animated expression;
for common vertices in the neutral animated expression that are associated with both the first blendshape and the second blendshape, generating a third set of vertex displacements by combining, in a nonlinear manner, data comprising:
weights from the first set of weights and displacements from the first set of vertex displacements corresponding to the common vertices; and
weights from the second set of weights and displacements from the second set of vertex displacements corresponding to the common vertices;
applying the third set of vertex displacements to the common vertices to move the common vertices in the neutral animated expression to new locations and thereby produce a new animated expression; and
rendering the new animated expression to generate a two-dimensional image for display on a display device.

12. The computer program product of claim 11, wherein combining, in a nonlinear manner, includes a combination of nonlinear and linear operations.

13. The computer program product of claim 11, wherein combining includes determining an expected value of at least one vertex displacement included in the first set of vertex displacements and a corresponding vertex displacement included in the second set of vertex displacements.

14. The computer program product of claim 11, wherein combining, in a nonlinear manner, includes biasing the first set of vertex displacements that represent the difference between the first animated expression and the neutral animated expression.

15. The computer program product of claim 11, wherein combining, in a nonlinear manner, includes determining if a vertex displacement included in the first set of vertex displacements extends in a direction equivalent to a corresponding vertex displacement included in the second set of vertex displacements.

16. The computer program product of claim 15, wherein combining, in a nonlinear manner, includes applying a weight to the vertex displacement in the first set of vertex displacements that extends in the direction equivalent to the corresponding vertex displacement included in the second set of vertex displacements.

17. The computer program product of claim 11, wherein combining, in a nonlinear manner wherein combining, in a nonlinear manner, includes applying a weight that has an upper limit to at least one vertex displacement included in the first set of vertex displacements.

18. The computer program product of claim 11, wherein combining, in a nonlinear manner, includes applying a weight that is a normal of the first set of vertex displacements and the second set of vertex displacements to at least one displacement of the combined first and second set of vertex displacements.

19. The computer program product of claim 11, wherein the first animated expression includes a facial expression of an animated character.

20. The computer program product of claim 11, wherein combining, in a nonlinear manner, is initiated by user input.

21. A system comprising:
a computing device comprising:
a memory configured to store instructions; and
a processor configured to execute the instructions to perform a method comprising:
receiving a first set of weights for a first blendshape to be applied to a neutral animated expression, the first blendshape comprising a first set of vertex displacements that represents the difference between a first animated expression and the neutral animated expression;
receiving a second set of weights for a second blendshape to be applied to the neutral animated expression, the second blendshape comprising a second set of vertex displacements that represents the difference between a second animated expression and the neutral animated expression;
for common vertices in the neutral animated expression that are associated with both the first blendshape and the second blendshape, generating a third set of vertex displacements by combining, in a nonlinear manner, data comprising:
weights from the first set of weights and displacements from the first set of vertex displacements corresponding to the common vertices; and
weights from the second set of weights and displacements from the second set of vertex displacements corresponding to the common vertices;
applying the third set of vertex displacements to the common vertices to move the common vertices in the neutral animated expression to new locations and thereby produce a new animated expression; and
rendering the new animated expression to generate a two-dimensional image for display on a display device.

22. The system of claim 21, wherein combining, in a nonlinear manner, includes a combination of nonlinear and linear operations.

23. The system of claim 21, wherein combining includes determining an expected value of at least one vertex displacement included in the first set of vertex displacements and a corresponding vertex displacement included in the second set of vertex displacements.

24. The system of claim 21, wherein combining, in a nonlinear manner, includes biasing the first set of vertex displacements that represent the difference between the first animated expression and the neutral animated expression.

25. The system of claim 21, wherein combining, in a nonlinear manner, includes determining if a vertex displacement included in the first set of vertex displacements extends in a direction equivalent to a corresponding vertex displacement included in the second set of vertex displacements.

26. The system of claim 25, wherein combining, in a nonlinear manner, includes applying a weight to the vertex displacement in the first set of vertex displacements that extends in the direction equivalent to the corresponding vertex displacement included in the second set of vertex displacements.

27. The system of claim 21, wherein combining, in a non-linear manner, includes applying a weight that has an upper limit to at least one vertex displacement included in the first set of vertex displacements.

28. The system of claim 21, wherein combining, in a non-linear manner, includes applying a weight that is a normal of the first set of vertex displacements and the second set of vertex displacements to at least one displacement of the combined first and second set of vertex displacements.

29. The system of claim 21, wherein the first animated expression includes a facial expression of an animated character.

30. The system of claim 21, wherein combining, in a non-linear manner, is initiated by user input.

* * * * *

UNITED STATES PATENT AND TRADEMARK OFFICE
CERTIFICATE OF CORRECTION

| | |
|---|---|
| PATENT NO. | : 9,183,660 B2 |
| APPLICATION NO. | : 14/090686 |
| DATED | : November 10, 2015 |
| INVENTOR(S) | : Michael Koperwas and Frederic P. Pighin |

It is certified that error appears in the above-identified patent and that said Letters Patent is hereby corrected as shown below:

Claims

In claim 17, column 11, lines 64-65, please delete the second appearance of the phrase "wherein combining, in a nonlinear manner", so that the claim reads:

17. The computer program product of claim 11, wherein combining, in a nonlinear manner, includes applying a weight that has an upper limit to at least one vertex displacement included in the first set of vertex displacements.

Signed and Sealed this
Twenty-second Day of March, 2016

Michelle K. Lee
*Director of the United States Patent and Trademark Office*